United States Patent
Ge et al.

(10) Patent No.: US 12,325,765 B2
(45) Date of Patent: Jun. 10, 2025

(54) HYDROPHOBIC HIGH HEAT OPTICAL ACRYLIC COPOLYMERS

(71) Applicant: ARKEMA FRANCE, Colombes (FR)

(72) Inventors: Jiaxin J. Ge, Lower Providence, PA (US); Sri R. Seshadri, Holland, PA (US); Gary A. Hall, Oaklyn, NJ (US)

(73) Assignee: TRINSEO EUROPE GMBH, Horgen (CH)

( * ) Notice: Subject to any disclaimer, the term of this patent is extended or adjusted under 35 U.S.C. 154(b) by 659 days.

(21) Appl. No.: 17/600,981

(22) PCT Filed: Apr. 2, 2020

(86) PCT No.: PCT/US2020/026377
§ 371 (c)(1),
(2) Date: Oct. 1, 2021

(87) PCT Pub. No.: WO2020/206113
PCT Pub. Date: Oct. 8, 2020

(65) Prior Publication Data
US 2022/0356281 A1   Nov. 10, 2022

Related U.S. Application Data

(60) Provisional application No. 62/829,183, filed on Apr. 4, 2019.

(51) Int. Cl.
C08F 220/14    (2006.01)
C08J 5/18      (2006.01)
G02B 1/04      (2006.01)

(52) U.S. Cl.
CPC .............. C08F 220/14 (2013.01); C08J 5/18 (2013.01); G02B 1/04 (2013.01); C08F 2800/20 (2013.01); C08J 2333/12 (2013.01)

(58) Field of Classification Search
CPC .................................................. C08F 220/14
See application file for complete search history.

(56) References Cited

U.S. PATENT DOCUMENTS

| | | | |
|---|---|---|---|
| 3,661,994 A | 5/1972 | Hwa et al. | |
| 3,843,753 A | 10/1974 | Owens | |
| 4,521,568 A | 6/1985 | Mori et al. | |
| 4,906,696 A | 3/1990 | Fischer et al. | |
| 5,043,405 A | 8/1991 | Koseki et al. | |
| 5,270,397 A | 12/1993 | Rhein et al. | |
| 7,101,930 B2 | 9/2006 | Martin et al. | |
| 7,795,348 B2 | 9/2010 | Noda et al. | |
| 8,299,168 B2 | 10/2012 | Münzmay et al. | |
| 9,546,266 B2 | 1/2017 | Hanley et al. | |
| 9,546,268 B2 | 1/2017 | Boutilier et al. | |
| 9,725,548 B2 | 8/2017 | Boday et al. | |
| 10,043,930 B2 | 8/2018 | Lefebvre et al. | |
| 11,891,466 B2 | 2/2024 | Ge et al. | |
| 2007/0055017 A1 | 3/2007 | Schultes et al. | |
| 2009/0074695 A1 | 3/2009 | Mahe et al. | |
| 2014/0309395 A1 | 10/2014 | Koike et al. | |
| 2015/0038634 A1 | 2/2015 | Sun et al. | |
| 2015/0044161 A1 | 2/2015 | Chuang et al. | |
| 2015/0175835 A1 | 6/2015 | Ge et al. | |
| 2017/0298217 A1 | 10/2017 | Doessel et al. | |
| 2018/0362688 A1 | 12/2018 | Bourrigaud et al. | |

FOREIGN PATENT DOCUMENTS

| | | | |
|---|---|---|---|
| CN | 1643008 A | | 7/2005 |
| CN | 104011097 A | | 8/2014 |
| CN | 105209548 A | | 12/2015 |
| DE | 38 90 136 C2 | | 6/1993 |
| EP | 2789634 A1 | | 10/2014 |
| JP | S64-001749 A | | 1/1989 |
| JP | 02233710 A | | 9/1990 |
| JP | 2002161112 A | | 6/2002 |
| JP | 2013114198 A | | 6/2013 |
| JP | 2014040553 A | | 3/2014 |
| KR | 20090081338 A | * | 7/2009 |
| KR | 10-2014-0099511 A | | 8/2014 |

(Continued)

OTHER PUBLICATIONS

Matsumoto, "Radical polymerization of 4-tert-butylcyclohexyl methacrylate: polymerization kinetics and polymer properties", Macromolecules, 1993, vol. 26, Issue, 7, 1659-1665. (Year: 1993).*

(Continued)

*Primary Examiner* — Michael F Pepitone
(74) *Attorney, Agent, or Firm* — Buchanan Ingersoll & Rooney PC

(57) ABSTRACT

The invention relates to acrylic copolymers and terpolymers incorporating high Tg, hydrophobic (meth)acrylates that have high thermal stability and excellent optical properties. These copolymers are optically clear, and provide a copolymer having a Tg of 115-140 C, along with sufficiently high molecular weight. The copolymer is found to exhibit high heat resistance, high light transmission, low haze, low moisture uptake, excellent environmental stability, excellent high temperature thermal stability, and excellent mechanical properties, along with excellent UV resistance. The copolymer, or terpolymer may be used to form lighting pipes, thin wall parts, optical lenses, extruded films, (co-)extruded sheets/profiles, thermo-formable sheets, cast sheets, composites, etc.

12 Claims, No Drawings

(56) References Cited

FOREIGN PATENT DOCUMENTS

| KR | 20170004719 A | 1/2017 |
|----|---------------|--------|
| TW | 201431939 A | 8/2014 |
| WO | 8906248 A1 | 7/1989 |
| WO | 2014054543 A1 | 4/2014 |
| WO | 2018152522 A1 | 8/2018 |
| WO | 2018152541 A1 | 8/2018 |
| WO | 2020206108 A1 | 10/2020 |
| WO | 2020206113 A1 | 10/2020 |

OTHER PUBLICATIONS

Machine translation of KR 20090081338 A, retrieved Oct. 2024 (Year: 2024).*
Chinese Office Action for Chinese Application No. 202080026085.4, dated Oct. 28, 2022 with translation, 18 pages.
Extended European Search Report for Application No. 20784709.6, dated Dec. 21, 2022, 7 pages.
Extended European Search Report for Application No. 20783818.6, dated Dec. 21, 2002, 7 pages.
International Search Report and Written Opinion for International Application No. PCT/US20/26370, dated Jun. 30, 2020, 7 pages.
Chinese Office Action for Chinese Application No. 202080026708.8, dated Nov. 2, 2022 with translation, 20 pages.
International Preliminary Report on Patentablity for International Application No. PCT/US2020/026377, dated Sep. 28, 2021, 6 pages.
International Preliminary Report on Patentability for International Application No. PCT/2020/026370, dated Sep. 28, 2021, 7 pages.
International Search Report and Written Opinion for International Application No. PCT/US2020/026377, dated Jun. 30, 2020, 6 pages.
International Search Report and Written Opinion for International Application No. PCT/US2023/014454, mailed Apr. 25, 2023, 12 pages.
Levels of Residual Monomers(s) in Acrylic Polymers, Methacrylate Producers Association, 2019, 4 pages.
Non Final Office Action for U.S. Appl. No. 17/687,199, mailed Apr. 12, 2023, 12 pages.
Office Action (Notice of Reasons for Rejection) issued on Apr. 2, 2024, by the Japanese Patent Office in corresponding Japanese Patent Application No. 2021-560389, and an English Translation of the Office Action. (11 pages).
Office Action (Communication pursuant to Article 94(3) EPC) issued Jun. 28, 2024, by the European Patent Office in corresponding European Patent Application No. 20 783 818.6-1102. (3 pages).
Office Action issued by the U.S. Patent and Trademark Office in the U.S. Appl. No. 17/687,222, mailed Jul. 18, 2024, U.S. Patent and Trademark Office, Alexandria, VA. (22 pages).
Office Action (Fifth Office Action) issued Dec. 31, 2024, by the National Intellectual Property Administration, P. R. China in corresponding Chinese Patent Application No. 202080026085.4 and an English translation of the Office Action. (26 pages).
Office Action (Notice of Reasons for Rejection) issued Dec. 24, 2024, by the Japan Patent Office in corresponding Japanese Patent Application No. 2021-560389 and an English translation of the Office Action. (7 pages).
Office Action issued by the U.S. Patent and Trademark Office in the U.S. Appl. No. 17/687,222, mailed Nov. 27, 2024, U.S. Patent and Trademark Office, Alexandria, VA. (18 pages).
Office Action issued by the U.S. Patent and Trademark Office in the U.S. Appl. No. 17/600,945, mailed Sep. 25, 2024, U.S. Patent and Trademark Office, Alexandria, VA. (13 pages).
Office Action (Request for the Submission of an Opinion) issued Mar. 19, 2025, by the Korean Intellectual Property Office in corresponding Korean Patent Application No. 10-2021-7035480 and an English translation of the Office Action. (20 pages).

* cited by examiner

HYDROPHOBIC HIGH HEAT OPTICAL ACRYLIC COPOLYMERS

This application is a U.S. National Phase application of PCT International Application No. PCT/US2020/026377, filed Apr. 2, 2020, which claims the benefit of U.S. Provisional Application No. 62/829,183, filed Apr. 4, 2019, each of which are incorporated by reference herein in their entireties for all purposes.

FIELD OF THE INVENTION

The invention relates to acrylic copolymers and terpolymers incorporating high Tg, hydrophobic (meth)acrylates and derivatives that have high thermal stability and excellent optical properties. These copolymers are optically clear, and provide a copolymer having a Tg of 115-150° C., along with sufficiently high molecular weight. The copolymer is found to exhibit high heat resistance, high light transmission, low haze, low moisture uptake, excellent environmental stability, excellent high temperature thermal stability, and excellent mechanical properties, along with excellent UV resistance. The copolymer, or terpolymer may be used to form lighting pipes, thin wall parts, optical lenses, extruded films, (co-) extruded sheets/profiles, thermo-formable sheets, cast sheets, composites, etc.

BACKGROUND OF THE INVENTION

Thermoplastic polymers and copolymers, especially (meth)acrylic polymers, have excellent characteristics such as transparency, mechanical properties and processability and are widely used in various fields such as automobile parts, electrical parts, industrial parts, optical materials, various parts of household electrical appliances, aesthetical parts, miscellaneous goods and the like.

High Tg acrylic polymers are useful in applications requiring a high optical clarity and high heat resistance, such as automotive front inner lenses, thin wall parts, lighting pipes, optical protection/retardation films in electronic devices, solar panels/films, home appliance, composites, and others. It is expected the market for high heat acrylic copolymers in automotive LED front inner lenses and thin wall parts will rapidly increase. In addition, high heat acrylic films are also used in LED/OLED displays.

High Tg acrylic copolymers, such as methyl methacrylate/methacrylic acid copolymer are described in US 2018-0362688.

U.S. Pat. No. 10,043,930 describes high Tg acrylic copolymers, using a variety of high Tg comonomers, for use in photovoltaic front sheets.

A major problem with standard acrylic copolymers and products is the inability to pass a long-term environmental stability testing such as 85° C./85% RH test, as required for automotive front inner lenses, solar panels, and new optical films in electronics. Most high Tg monomers, such as methacrylic acid are hydrophilic, and its copolymers are not resistant to moisture.

The inventors have now surprisingly solved this problem, and have produced a material capable of passing an environmental stability test, while maintaining a high Tg and high optical clarity. The novel copolymers contain high Tg hydrophobic monomers to increase the hydrophobicity of the copolymer, while maintaining a high Tg and high molecular weight. The resulting high molecular weight, high Tg, high optical property copolymer is useful in many different applications requiring high heat, and/or moist environments.

Specifically, hydrophobic co-monomers tert-butyl cyclohexyl (meth)acrylate having a specific cis/trans ratio range, and 3,3,5, trimethyl cyclohexyl(meth)acrylate were found to copolymerize with pMMA to reduce the water absorption and enhance the hydrophobicity. In addition, a high Tg and/or Vicat temperature, high molecular weight was obtained. Films, sheets and articles made with the hydrophobic copolymer exhibited am light transmission of over 91% and a haze of less than 2.5%. The copolymer may include additional monomer units, making it a terpolymer, tetrapolymer, etc.

SUMMARY OF THE INVENTION

The invention relates, in a first aspect, to a high Tg, optically clear, hydrophobic acrylic copolymer composition containing a high Tg copolymer polymerized from 0.1 to 20 weight percent of monomer units chosen from tert-butyl cyclohexyl methacrylate, 3,3,5-trimethylcyclohexyl(meth)acrylate, and a mixture thereof; and from 50 to 80 weight percent methylmethacrylate monomer units, with optionally from 0 to 49.9 weight percent of other monomer units copolymerizable with methylmethacrylate. The copolymer formed has a Tg of from 115° C. to 150° C., preferably from 116° C. to 140° C., and more preferably from 120° C. to 130° C.

In a second aspect of the invention, the high Tg, optically clear, hydrophobic acrylic copolymer composition has a trans/cis ratio in the tert-butyl cyclohexyl methacrylate, and/or 3,3,5-trimethylcyclohexyl(meth)acrylate monomer units of from 30/70 to 85/15, more preferably from 40-60 to 80/20, and most preferably from 50/50 to 75/25.

In a third aspect of the invention, the high Tg, optically clear, hydrophobic acrylic copolymer of any of the above aspects, contains the optional other monomer(s) at from 0.01 to 25 weight percent of a high Tg comonomer. These optional monomers are chosen from methacrylic acid, acrylic acid, itaconic acid, alpha methyl styrene, maleic anhydride, maleimide, isobornyl methacrylate, norbornyl methacrylate, t-butyl methacrylate, cyclohexyl methacrylate, acrylamide and methacrylamide, or mixtures thereof, and especially 0.1 to 5 weight percent methacrylic acid.

In a fourth aspect of the invention the high Tg, optically clear, hydrophobic acrylic copolymer composition of any of the previous aspects may further comprising 50 to 3500 ppm of antioxidant, based on the weight of the copolymer solids.

In a fifth aspect of the invention, the high Tg, optically clear, hydrophobic acrylic copolymer composition of any of the previous aspects has a weight average molecular weight of from 55,000 g/mole to 250,000 g/mole, preferably from 75,000 g/mole to 200,000 g/mole, more preferably from greater than 90,000 g/mole. to 200,000 g/mole.

In a sixth aspect of the invention, the high Tg, optically clear, hydrophobic acrylic copolymer composition of any of the previous aspects, has a TWLT of at least 89%, preferably at least 91% and more preferably at least 92%; and an optical haze of less than 5%, preferably less than 3% and most preferably less than 2%, as measured on a 3.2 mm thick plaque, using ASTM method D1003.

In a seventh aspect of the invention, the high Tg, optically clear, hydrophobic acrylic copolymer composition of any of the other aspects has a refractive index of 1.47-1.50 at the wavelength of 589 nm.

In an eighth aspect of the invention, the high Tg, optically clear, hydrophobic acrylic copolymer composition of any of the above aspects is a blend of said high Tg, clear, hydrophobic acrylic copolymer composition with one or more compatible polymers, the high Tg, clear hydrophobic acrylic copolymer composition being present in the blend at from 5 to 95 weight percent, preferably 5 to 75 weight percent, and more preferably at 10 to 60 weight percent of the total polymer solids.

In a ninth aspect of the invention, an article contains the high Tg, optically clear, hydrophobic acrylic copolymer composition of any of the other aspects. The article being a lighting pipe, thin wall parts, optical lens, extruded films, (co-)extruded sheet or profile, a thermo-formable sheet, a cast sheet, a composites, an LED/OLED optical component, a co-extruded profiles used in building & constructions or reflective signage.

DETAILED DESCRIPTION OF THE INVENTION

"Copolymer" is used to mean a polymer having two or more different monomer units, including copolymers, and polymers with three or more different monomers, such as terpolymers and tetrapolymers. "Polymer" is used to mean both homopolymer and copolymers. Polymers may be straight chain, branched, star, comb, block, or any other structure. The polymers may be homogeneous, heterogeneous, and may have a gradient distribution of co-monomer units. All references cited are incorporated herein by reference. As used herein, unless otherwise described, percent shall mean weight percent. Molecular weight is a weight average molecular weight as measured by GPC. In cases where the polymer contains some cross-linking, and GPC cannot be applied due to an insoluble polymer fraction, soluble fraction/gel fraction or soluble faction molecular weight after extraction from gel is used.

By "hydrophobic" as used herein means that a 25 weight percent solution of the copolymer dissolved in toluene, when heated with stirring to 65° C. to form opaque viscous gels-gelation, then allowed to cool to room temperature (23° C.), is optically clear, along with some soft gels. Upon heating to 65° C., the physical gelation occurs throughout the whole "solution" while the viscous "solution" becomes opaque, resulting in a viscous jelly-like material due to two phase separations of hydrophilic copolymers in hydrophobic solvent (such as toluene) at a high temperature (65° C.). In addition, it is a physically reversible process.

By "(meth)acrylic" or "(meth)acrylate" as used herein denotes both the acrylate and the methacrylate.

In one embodiment, the hydrophobic copolymer of the invention passes an 85° C./85% RH test.

The invention relates to a copolymer of methyl methacrylate and specific hydrophobic, high Tg comonomers. "high Tg monomer" refers to a monomer, that when polymerized produces a polymer having a Tg of greater than 116° C., and preferably greater than 120° C., and more preferably of greater than 130° C. Examples of useful hydrophobic, high Tg monomers include, but are not limited to, tert-butyl cyclohexyl methacrylate as a specific blend range of trans/cis isomers, and 3,3,5-trimethylcyclohexyl(meth)acrylate, and its isomer blends.

Tert-Butyl Cyclohexyl Methacrylate

Tert-butyl cyclohexyl (meth)acrylate has the structural formulas below:

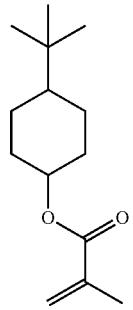

Tert-butyl cyclohexyl methacrylate

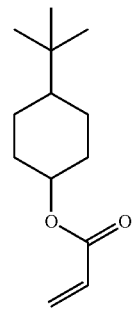

Tert-butyl cyclohexyl acrylate

The monomer is a mixture of the cis- and trans-forms, having a trans/cis ratio of between 30/70 and 85/15, preferably 40/60 to 80/20, and more preferably 50/50 to 75/25.

The level of tert-butyl cyclohexyl (meth)acrylate in the final copolymer generally ranges from 0.2-20 weight percent, and more preferably from 0.5 to 10 weight percent of tert-butyl cyclohexyl methacrylate is used in the copolymer. It has been found that as little as 1 weight percent, and even 0.5 weight percent of tert-butyl cyclohexyl methacrylate, provides a copolymer having a hydrophobic character. The Tg of the copolymer of the invention is from 116° C. to 140° C.

3,3,5-trimethylcyclohexyl(meth)acrylate 3,3,5-trimethylcyclohexyl(meth)acrylate has the structural formulas below:

The monomer is a mixture of the cis- and trans-forms.

The level of 3,3,5-trimethylcyclohexyl(meth)acrylate in the final copolymer generally ranges from 0.2-20 weight percent, and more preferably from 0.5 to 10 weight percent of tert-butyl cyclohexyl methacrylate is used in the copolymer. It has been found that as little as 1 weight percent, and even 0.5 weight percent of tert-butyl cyclohexyl methacrylate, provides a copolymer having a hydrophobic character. The Tg of the copolymer of the invention is from 116° C. to 135° C.

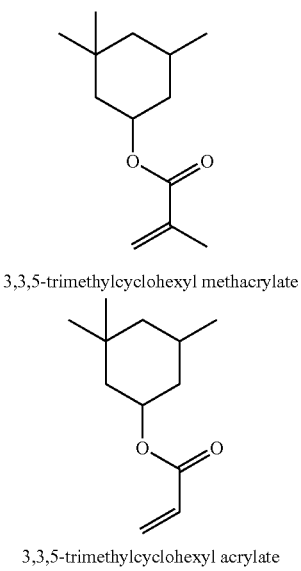

3,3,5-trimethylcyclohexyl methacrylate 3,3,5-trimethylcyclohexyl acrylate

The level of tert-butyl cyclohexyl methacrylate or 3,3,5-trimethylcyclohexyl methacrylate in the final copolymer generally ranges from 0.2-20 weight percent, and more preferably from 0.5 to 10 weight percent based on the total monomer units in the copolymer. It has been found that as little as 1 weight percent, and even 0.5 weight percent of tert-butyl cyclohexyl methacrylate, provides a copolymer having a hydrophobic character. The Tg of the copolymer of the invention is from 116° C. to 140° C.

Acrylic Monomers, MMA

One or more of the hydrophobic, high Tg monomers, is copolymerized with one or more other monomers. In a preferred embodiment of the invention the copolymer contains at least 50 weight percent of methylmethacrylate monomer units, preferably at least 70 weight percent and more preferably at least 80 weight percent methylmethacrylate monomer units make up the copolymer.

The copolymer of the invention, in addition to the hydrophobic, high Tg monomer(s), and methyl methacrylate, may include 0 to 49.5 weight percent of other acrylate and methacrylate monomers or other ethylenically unsaturated monomers, included but not limited to, styrene, alpha methyl styrene, acrylonitrile, and crosslinkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer mixture. In addition to carboxyl functionality, other functionality can be added to the high molecular weight acrylic process aid through functional comonomers, including epoxy (such as glycidyl methacrylate), hydroxyl, and anhydride functional groups. Functional monomer units (monomer units having a functional group) can be present at up to 70 weight percent of the acrylic polymer, preferably up to 50 weight percent.

In a preferred embodiment, the acrylic copolymer has a high Tg of greater than 115° C., more preferably greater than 120° C., greater than 125° C., greater than 130° C., greater than 135° C., and even greater than 140° C. In addition to the tert-butyl cyclohexyl methacrylate and 3,3,5-trimethylcyclohexyl(meth)acrylate, other high Tg monomers may optionally be present at levels of 0 to 25 weight percent, and more preferably from 0 to 10 weight percent. The other high Tg monomers may be hydrophilic, hydrophobic or have a neutral character, and include, but are not limited to methacrylic acid, acrylic acid, itaconic acid, alpha methyl styrene, maleic anhydride, maleimide, isobornyl methacrylate, norbornyl methacrylate, t-butyl methacrylate, cyclohexyl methacrylate, acrylamide and methacrylamide.

In one embodiment it was found that the hydrophobic effect of the tert-butyl cyclohexyl methacrylate and/or 3,3,5-trimethylcyclohexyl(meth)acrylate is strong enough to overcome the hydrophilic effect of hydrophilic comonomers used at lower levels, to produce an over-all hydrophobic copolymer.

Synthesis Process

The copolymers of the invention are obtained through melt polymerization, including but not limited to solution polymerization, emulsion polymerization, and suspension polymerization.

It was found that the process conditions can have a significant effect on the Tg of the copolymer. In general, solution polymerization of the copolymer was found to produce a higher level of syndiotacticity (~60%) and a higher Tg than those (~50%) in copolymers produced in a melt process. In a lab solution process run at about 65-75° C., the Tg of the copolymer was found to be about 124° C. In a pilot plant melt polymer process run at about 160° C., the Tg was found to be about 120° C. While not being bound by any particular theory, it is believed that the difference in copolymer Tg is related to the syndiotacticity percentage, which is higher at a lower process temperature. In addition, toluene used in solution polymerization may have different chemical environments.

Additives

The copolymer of the invention can be blended with typical additives used in thermoplastics. These include, but are not limited to fillers, surface modifying additives, antioxidants, UV screens, processing aids, fibers, lubricant agents, heat stabilizers, flame retardants, synergists, pigments and other coloring agents.

While impact modifiers could be added to the composition, they would have a negative effect on the optical clarity. If used, they would need to be refractive index matched to the matrix, meaning a refractive index difference with the matrix of less than 0.02, and preferably less than 0.01. Preferably, the composition contains no impact modifier.

Other polymer additives could include polycarbonates, polyurethanes, polysulfones, polyamides, polyolefin including copolymers and terpolymers based on these polymers, and including linear, branched, block, and grafted polymer structures. Examples of matting agents include, but are not limited to, cross-linked polymer particles of various geometries. The amount of filler and additives included in the polymer compositions of each layer may vary from about 0.01% to about 70% of the combined weight of polymer, additives and filler. Generally, amounts from about 5% to about 45%, from about 10% to about 40%, are included.

Antioxidants

In one embodiment, selected antioxidants may be used to improve the thermal stability of the resins at high temperature such as 255-275° C. and reduce the yellowing at high temperature. The loading of the antioxidants in the final resins formulations are at the levels of ~50 ppm to 3500 ppm, preferably about 100 ppm to about 2500 ppm based on the total weight of the composition. Non-limiting examples of useful antioxidants include sterically hindered phenols, organophosphites hindered amine light stabilizers (HALS), benzotriazoles, triazines, benzophenones, and cyanoacrylates.

Properties

The novel hydrophobic high heat acrylic materials of the invention are designed to meet the requirement of high light transmission in the visible wavelength region, extremely low haze, high heat resistance, low water/moisture uptake, excellent environmental stability, and excellent mechanical properties, optionally with excellent UV resistance, making them especially useful in certain high heat, high optical clarity applications.

The Tg of the copolymers generally ranges from 115° C.-150° C., preferably from 116° C. to 140° C., and more preferably from 120° C. to 130° C.

The weight average molecular weight of the acrylic copolymers is greater than 55,000 g/mole, preferably greater than 75,000 g/mole, more preferably greater than 90,000 g/mole, and even more preferably greater than 100,000 g/mole. The maximum molecular weight is about 250,000 g/mole, and more preferably about 200,000 g/mole The hydrophobic high Tg copolymers of the invention, including co-, ter-, and tetrapolymers of the invention possess a refractive index of 1.47-1.50 at the wavelength of 589 nm.

The copolymer provides a low moisture adsorption and enhanced hydrophobicity.

The copolymers of the invention have excellent optical properties, with a TWLT of at least 89%, preferably at least 91% and more preferably at least 92%; and an optical haze of less than 5%, preferably less than 3% and most preferably less than 2%.

In addition to the above properties, the copolymer of the invention has excellent environmental stability, and excellent mechanical properties, along with excellent UV resistance.

Blends of the high Tg copolymers of the invention with other polymers, and especially acrylic polymers is anticipated by the invention. The high Tg copolymers or terpolymers of the invention (with the refractive index of 1.47-1.50) are optically and physically compatible with many typical optical acrylic copolymers (with a refractive index of about 1.49) in their mixtures and/or combinations through melt processing/solution blends. The copolymer of the invention would typically be blended with other acrylic resins at 5 to 95 weight percent, preferably 5 to 75 weight percent, and more preferably at 10 to 60 weight percent of the total polymer solids.

Blends with other compatible polymers, in all ratios, are also anticipated by this invention. Especially useful compatible polymers for a blend include, but are not limited to, other poly(methyl methacrylate) copolymers such as pMMA-EA and PMMA-MA, poly(styrene-acrylonitrile, SAN), polyvinylidene fluoride, copolymers of vinylidene fluoride and hexafluoropropene, and polylactic acid.

Uses

The copolymers of the invention are thermoplastic, and can be easily shaped into sheets, films, light pipe and lenses The excellent heat stability, high molecular weight, moisture resistance and excellent optical properties, makes the copolymer of the invention especially useful for forming lighting pipes, thin wall parts, optical lenses, extruded films, (co-)extruded sheets/profiles, thermo-formable sheets, cast sheets, composites, and others.

High heat acrylic films of the invention may be used in LED/OLED displays. If cost-effective OLED technologies are widely used to replace LED/LCD technologies, the number of optical polarizers for OLED may be reduced.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

EXAMPLES

Testing Methods:
A. Melt flow rate (MFR) measurement: Instron Ceast MF30 equipment was used for polymers in melt flow rate measurements. The die temperature was controlled at 230° C. while the loading cell weight was at 3.8 kg. The dried pellets were used near 20° C. below the $T_g$ over 8 hours.
B. Gel permeation chromatography (GPC): Waters Alliance 2695 and Waters Differential Refractometer 2410 were used to make polymer molecular weight measurements. Columns were based on two PL Gel mixed C columns and a guard column (7.8 mm I.D.×30 cm, 5 μm). THF (HPLC grade) was selected as a solvent. Temperature was controlled at 35° C. Ten poly(methyl methacrylate) standards were used in the calibration, ranging in $M_p$ (peak molecular weight) from 550 to 1,677,000 g/mole.
C. Differential scanning calorimetry (DSC): The glass transition temperatures of acrylic polymers were measured at a heating rate of 10° C./minutes in Na using TA instruments Q2000 DSC, during the second heating. The first heating was used to heat the sample to 170° C. at a heating rate of 10° C./minute, then, the sample was cooled down to 0° C. at a cooling rate of 10° C./minute. The sample weight was controlled at 5-10 mg.
D. Thermogravimetry (TGA): The thermal decomposition temperatures of acrylic polymers were measured at a heating rate of 10° C./minute in Na using TA instruments Q5000 TGA. The sample weight was controlled at 5-10 mg. The samples were pre-dried under a vacuum oven at 100° C. overnight.
E. Total light transmission: The total light transmission was measured from film and/or plaque samples in a transmission mode using Perkin Elmer Lambda 950 with a 150 mm integrating sphere. The selected UV/Vis wavelength range was from 200 nm to 800 nm in UV/Vis region.
F. Haze: Optical haze of clear film and/or plaque samples was measured using BYK HazeGard Plus under ASTM method D1003.
G. Tensile strength and elongation: The tensile strength, modulus and elongation of the tensile bars was evaluated using Instron Model 4202 at the crosshead speed of 5 mm/minute using ASTM D638 method after being preconditioned at 23° C./48 hours. The tensile was at 6" in length while the width was at 0.50". The sample thickness was at 0.125".
H. Refractive index: Refractive index of the polymer film was measured at three different wavelengths of 402 nm, 518 nm, and 636.5 nm using an optical prism coupler Metricon 2010 from Metricon Inc while the refractive index was calculated at a selected wavelength of 589 nm.

I. NMR: Samples were prepared by dissolving ~200 mg of pellets in ~4 ml $CDCl_3$ in separate 10 mm NMR tubes for $^{13}C$ NMR. The 41 spectra were acquired on the Bruker AV III HD 500 (11.07 T) spectrometer with a 5 mm $^1H/^{19}F/^{13}C$ TXO probe at 25° C. before and after derivatization of MAA. The $^{13}C$ spectra were acquired on the Bruker AV 400 (9.4 T) with a 10 mm BBO probe at 50° C.

J. Vicat softening temperatures: The samples were tested in Instron HV6M under 10N and 50N external forces using ASTM method D1525. The sample heating rate was controlled at the speed of 50° C./hour. The injection molded samples were annealed at ~20 C below the Tg value for 16 hours and were kept in a desiccator oven before testing.

K. Water absorption: The injection molded samples were immersed in a D. I. water bath (23° C.) using ASTM method D570. The plaque sample size was molded at 45 mm (width)×67 mm (length)×3.2 mm (thickness). The water absorption value was measured based on the weight gain while the sample surfaces were cleaned up with dry tissues.

L. 85° C./85% RH testing: The injection molded samples were held under 85° C./85% RH using a Thermotron SE-1000-6-6 environmental oven with D. I. water for a humidifier. The tensile bar size was molded at 12.5 mm (width)×165 mm (length)×3.2 mm (thickness). The defects such as crazing and/or cracking lines were inspected visually during the 85° C./85% RH tests.

PMMA-Co-Tut-Butyl Cyclohexyl Methacrylate

Example 1: (pMMA Copolymer with 3.7% Tert-Butyl Cyclohexyl Methacrylate)

This example demonstrates the preparation of a high molecular weight copolymer of methyl methacrylate and tert-butyl cyclohexyl methacrylate, having a 51% trans/49% cis isomer ratio. 96.30 parts of methyl methacrylate and 3.70 parts of tert-butyl cyclohexyl methacrylate were charged into a reaction vessel containing 300 parts of toluene near 23° C. with a mechanical stirring speed of 380 rpm. AIBN (from Aldrich) was used as an initiator at a level of 0.337 parts. The polymerization reaction occurred at 68-70° C. for 7 hours. When the conversion reached >60%, the residual monomers were removed through a precipitation in methanol (MeOH, ×20 times). Then, the solid polymer powder was dissolved in acetone at the solid content of 25 wt. % and the polymer solution was precipitated in sufficient MeOH again. The re-precipitated white powder samples were dried at 180° C. and 210° C. in a vacuum oven for 8 hours and 8 hours, respectively. The melt flow rate of the polymer was measured to be 4.1 g/10 minutes at 230° C. under 3.8 kg. The refractive index of the resulting polymer was measured at 1.491 at 589 nm.

The resulting polymer was confirmed using $^1H$ NMR to possess the composition of pMMA/tert-butyl cyclohexyl methacrylate (96.5/3.5 w/w). The syndiotacticity of the copolymer was determined at 60% from the chemical shift of 44.5 ppm using $^{13}C$ NMR while the isotaticity and atacticity were measured at 4% and 36% from 45.5 ppm and 45.0 ppm. The glass transition temperature of the resin was measured to be 125° C. in Na using DSC at the heating rate of 10° C./minute. The weight average molecular weight Mw of the resin was measured as being 88,000 g/mole using GPC along with a Mw/Mn (polydispersity) value of 1.9. The light transmission from a 120 um casted film was measured to be 92.2% at 560 nm using Lambda 950 with a 150 mm integrating sphere while the haze was measured to be 0.5% using a hazemeter (Haze Gard Plus from BYK).

Example 2 (pMMA Copolymer Containing 5.1% Tert-Butyl Cyclohexyl Methacrylate with Tg=~128° C.)

This example demonstrates the preparation of a high molecular weight copolymer of methyl methacrylate and tert-butyl cyclohexyl methacrylate, having a 51% trans/49% cis isomer ratio. 94.9 parts of methyl methacrylate and 5.10 parts of tert-butyl cyclohexyl methacrylate were charged into a reaction vessel containing 300 parts of toluene near 23° C. with a mechanical stirring speed of 360 rpm. AIBN (from Aldrich) and Luperox® 26 (from Arkema) were used as an initiator at a level of 0.337 parts and 0.0 parts, respectively. The polymerization reaction occurred at 65-67° C. for 7 hours. When the conversion reached >60%, the residual monomers were removed through a precipitation in MeOH (×20 times). Then, the solid polymer powder was dissolved in acetone at the solid content of 25 wt. % and the polymer solution was precipitated in sufficient MeOH again. The re-precipitated white powder samples were dried at 180° C. and 210° C. in a vacuum oven for 8 hours and 8 hours, respectively. The melt flow rate of the polymer was measured to be 2.7 g/10 minutes at 230° C. under 3.8 kg. The refractive index of the resulting polymer was measured at 1.490 at 589 nm.

The resulting polymer was confirmed using $^1H$ NMR to possess the composition of pMMA/tert-butyl cyclohexyl methacrylate (95.7/4.3 w/w). The syndiotacticity of the copolymer was determined at 60% from the chemical shift of 44.5 ppm using $^{13}C$ NMR while the isotaticity and atacticity were measured at 4% and 36% from 45.5 ppm and 45.0 ppm. The glass transition temperature of the resin was measured to be 128° C. in Na using DSC at the heating rate of 10° C./minute. The weight average molecular weight Mw of the resin was measured as being 100,000 g/mole using GPC along with a Mw/Mn (polydispersity) value of 2.1. The light transmission from a 100 um casted film was measured to be 92.3% at 560 nm using Lambda 950 with a 150 mm integrating sphere while the haze was measured to be 0.5% using a hazemeter (Haze Gard Plus from BYK).

Example 3 (pMMA Terpolymer with 6.1% Tert-Butyl Cyclohexyl Methacrylate and 4.6% MAA)

This example demonstrates the preparation of a high molecular weight copolymer of methyl methacrylate and tert-butyl cyclohexyl methacrylate (having a 51% trans/49% cis isomer ratio). 89.3 of methyl methacrylate, 4.6 parts of methacrylic acid and 6.1 parts of tert-butyl cyclohexyl methacrylate were charged into a reaction vessel containing 300 parts of toluene near 23° C. with a mechanical stirring speed of 360 rpm. In addition, AIBN (Aldrich) and Luperox® 26 (from Arkema) were used as an initiator at a level of 0.350 parts and 0 parts, respectively. The polymerization reaction occurred at 65-68° C. for 7 hours. When the conversion reached >60%, the residual monomers were removed through a precipitation in MeOH (×20 times). Then, the solid polymer powder was dissolved in acetone at the solid content of 25 wt. % and the polymer solution was precipitated in sufficient MeOH again. The re-precipitated white powder samples were dried at 180° C. and 210° C. in a vacuum oven for 8 hours and 8 hours, respectively. The melt flow rate of the polymer was measured to be 1.6 g/10 minutes at 230° C. under 3.8 kg. The refractive index of the resulting polymer was measured at 1.491 at 589 nm.

The resulting polymer was confirmed using $^1$H NMR to possess the composition of pMMA/tert-butyl cyclohexyl methacrylate/methacrylic acid (91.3/4.9/3.8 w/w/w). The syndiotacticity of the copolymer was determined at 60% from the chemical shift of 44.5 ppm using $^{13}$C NMR while the isotacticity and atacticity were measured at 4% and 36% from 45.5 ppm and 45.0 ppm. The glass transition temperature of the resin was measured to be 135° C. in Na using DSC at the heating rate of 10° C./minute. The weight average molecular weight Mw of the resin was measured as being 110,000 g/mole using GPC along with a Mw/Mn (polydispersity) value of 2.0. The light transmission from a 125 um casted film was measured to be 92.2% at 560 nm using Lambda 950 with a 150 mm integrating sphere while the haze was measured to be 0.5% using a hazemeter (Haze Gard Plus from BYK).

Example 4 (pMMA Copolymer Containing 1.0% Tert-Butyl Cyclohexyl Methacrylate with Tg=~120° C.)

This example demonstrates the preparation of a high molecular weight copolymer of methyl methacrylate and tert-butyl cyclohexyl methacrylate (having a 73% trans/27% cis isomer ratio). 9866 parts of methyl methacrylate and 100 parts of tert-butyl cyclohexyl methacrylate were charged in to a reaction vessel near 0° C. under Na with a mechanical stirring speed of 100 rpm. In addition, Luperox® 531 (from Arkema) was used as an initiator at a level of 1.6 parts while 32 parts of n-dodecyl mercaptan (n-DDM from Aldrich) was used as a chain transfer agent, along with 1.0 part of di-tert-dodecyl disulfide (DtDDS from Arkema). The polymerization reaction occurred at 160° C. for 7 hours. When the conversion reached around 50%, the residual monomers were removed through a venting system. The resulting polymer was passed through a single-screw extruder at a die temperature of 240° C. while the barrel temperatures were at 230-250° C. The melt stream went through a water bath before the pelletization. Then the polymer was pelletized into 3-4 mm long resin pellets and dried at 100° C. in a desiccator oven for 8 hours. The melt flow rate of the polymer was measured to be 2.1 g/10 minutes at 230° C. under 3.8 kg. The refractive index of the resulting polymer was measured at 1.491 at 589 nm.

The resulting polymer was confirmed using $^1$H NMR to possess the composition of pMMA/tert-butyl cyclohexyl methacrylate (99.1/0.9 w/w). The syndiotacticity of the copolymer was determined at 50% from the chemical shift of 44.5 ppm using $^{13}$C NMR while the isotacticity and atacticity were measured at 8% and 42% from 45.5 ppm and 45.0 ppm. The glass transition temperature of the resin was measured to be 120° C. in Na using DSC at the heating rate of 10° C./minute while the Vicat temperature was detected at 120° C. under 10N. The weight average molecular weight Mw of the resin was measured as being 105,000 g/mole using GPC along with a Mw/Mn (polydispersity) value of 2.0. The light transmission from a 3.2 mm plaque was measured to be 92.1% at 560 nm using Lambda 950 with a 150 mm integrating sphere while the haze was measured to be 1.0% using a hazemeter (Haze Gard Plus from BYK). The tensile modulus of the test sample was at 3.2 GPa while the tensile strength was at 78 MPa, along with a tensile elongation of 9.5%.

Example 5 (pMMA Copolymer Containing 3.0% Tert-Butyl Cyclohexyl Methacrylate with Tg=~119° C.)

This example demonstrates the preparation of a high molecular weight copolymer of methyl methacrylate and tert-butyl cyclohexyl methacrylate (having a 73% trans/27% cis isomer ratio). 9566 parts of methyl methacrylate and 300 parts of tert-butyl cyclohexyl methacrylate were charged in to a reaction vessel near 0° C. under Na with a mechanical stirring speed of 100 rpm. In addition, Luperox® 531 (from Arkema) was used as an initiator at a level of 1.6 parts while 32 parts of n-dodecyl mercaptan (n-DDM from Aldrich) was used as a chain transfer agent, along with 1.0 part of di-tert-dodecyl disulfide (DtDDS from Arkema). The polymerization reaction occurred at 160° C. for 7 hours. When the conversion reached around 50%, the residual monomers were removed through a venting system. The resulting polymer was passed through a single-screw extruder at a die temperature of 245° C. while the barrel temperatures were at 230-250° C. The melt stream went through a water bath before pelletization. Then the polymer was pelletized into 3-4 mm long resin pellets and dried at 100° C. in a desiccator oven for 8 hours. The melt flow rate of the polymer was measured to be 2.7 g/10 minutes at 230° C. under 3.8 kg. The refractive index of the resulting polymer was measured at 1.491 at 589 nm.

The resulting polymer was confirmed using $^1$H NMR to possess the composition of pMMA/tert-butyl cyclohexyl methacrylate (97.2/2.8 w/w). The syndiotacticity of the copolymer was determined at 50% from the chemical shift of 44.5 ppm using 13C NMR while the isotacticity and atacticity were measured at 8% and 42% from 45.5 ppm and 45.0 ppm. The glass transition temperature of the resin was measured to be 119° C. in Na using DSC at the heating rate of 10° C./minute while the Vicat temperature was detected at 119° C. under 10N. The weight average molecular weight Mw of the resin was measured as being 105,000 g/mole using GPC along with a Mw/Mn (polydispersity) value of 2.0. The light transmission from a 3.2 mm plaque was measured to be 92.0% at 560 nm using Lambda 950 with a 150 mm integrating sphere while the haze was measured to be 1.0% using a hazemeter (Haze Gard Plus from BYK). The tensile modulus of the test sample was at 3.1 GPa while the tensile strength was at 70 MPa, along with a tensile elongation of 9.2%.

Example 6 (pMMA Copolymer Containing 1.5% Tert-Butyl Cyclohexyl Methacrylate and 4% MAA with Tg=~123° C.)

This example demonstrates the preparation of a high molecular weight copolymer of methyl methacrylate and tert-butyl cyclohexyl methacrylate (having a 73% trans/27% cis isomer ratio). 9416 parts of methyl methacrylate, 400 parts of methacrylic acid, and 150 parts of tert-butyl cyclohexyl methacrylate were charged in to a reaction vessel near 0° C. under Na with a mechanical stirring speed of 100 rpm. In addition, Luperox® 531 (from Arkema) was used as an initiator at a level of 1.6 parts while 32 parts of n-dodecyl mercaptan (n-DDM from Aldrich) was used as a chain transfer agent, along with 1.0 part of di-tert-dodecyl disulfide (DtDDS from Arkema). The polymerization reaction occurred at 160° C. for 7 hours. When the conversion reached around 50%, the residual monomers were removed through a venting system. The resulting polymer was passed through a single-screw extruder at a die temperature of 240° C. while the barrel temperatures were at 230-250° C. The melt stream went through a water bath before the pelletization. Then the polymer was pelletized into 3-4 mm long resin pellets and dried at 100° C. in a desiccator oven for 8 hours. The melt flow rate of the polymer was measured to be 1.4 g/10 minutes at 230° C. under 3.8 kg. The refractive index of the resulting polymer was measured at 1.492 at 589 nm.

The resulting polymer was confirmed using $^1$H NMR to possess the composition of pMMA/tert-butyl cyclohexyl methacrylate/methacrylic acid (95.8/1.2/3.0 w/w). The syndiotacticity of the copolymer was determined at 50% from the chemical shift of 44.5 ppm using $^{13}$C NMR while the isotaticity and atacticity were measured at 8% and 42% from 45.5 ppm and 45.0 ppm. The glass transition temperature of the resin was measured to be 123° C. in Na using DSC at the heating rate of 10° C./minute while the Vicat temperature was detected at 123° C. under 10N. The weight average molecular weight Mw of the resin was measured as being 105,000 g/mole using GPC along with a Mw/Mn (polydispersity) value of 2.0. The light transmission from a 3.2 mm plaque was measured to be 91.9% at 560 nm using Lambda 950 with a 150 mm integrating sphere while the haze was measured to be 1.0% using a hazemeter (Haze Gard Plus from BYK). The tensile modulus of the test sample was at 3.3 GPa while the tensile strength was at 75 MPa, along with a tensile elongation of 9.6%.

Comparative 1 (pMMA copolymer containing 4.8% MAA with Tg=124° C.) This example demonstrates the preparation of a high molecular weight copolymer with 4.8% methacrylic acid. 9480 parts of methyl methacrylate and 480 parts of tert-butyl cyclohexyl methacrylate were charged in to a reaction vessel near 0° C. under Na with a mechanical stirring speed of 100 rpm. In addition, Luperox® 531 (from Arkema) was used as an initiator at a level of 1.6 parts while 38 parts of n-dodecyl mercaptan (n-DDM from Aldrich) was used as a chain transfer agent, along with 1.0 part of di-tert-dodecyl disulfide (DtDDS from Arkema). The polymerization reaction occurred at 160° C. for 7 hours. When the conversion reached around 50%, the residual monomers were removed through a venting system. The resulting polymer was passed through a single-screw extruder at a die temperature of 240° C. while the barrel temperatures were at 230-250° C. The melt stream went through a water bath before the pelletization. Then the polymer was pelletized into 3-4 mm long resin pellets and dried at 100° C. in a desiccator oven for 8 hours. The melt flow rate of the polymer was measured to be 2.2 g/10 minutes at 230° C. under 3.8 kg. The refractive index of the resulting polymer was measured at 1.494 at 589 nm.

The resulting polymer was confirmed using $^1$H NMR to possess the composition of pMMA/methacrylic acid (96.3/3.7 w/w). The syndiotacticity of the copolymer was determined at 50% from the chemical shift of 44.5 ppm using $^{13}$C NMR while the isotaticity and atacticity were measured at 8% and 42% from 45.5 ppm and 45.0 ppm. The glass transition temperature of the resin was measured to be 124° C. in $N_2$ using DSC at the heating rate of 10° C./minute while the Vicat temperature was detected at 121° C. under 10N. The weight average molecular weight Mw of the resin was measured as being 82,000 g/mole using GPC along with a Mw/Mn (polydispersity) value of 2.0. The light transmission from a 3.2 mm plaque was measured to be 92.0% at 560 nm using Lambda 950 with a 150 mm integrating sphere while the haze was measured to be 1.0% using a hazemeter (Haze Gard Plus from BYK). The tensile modulus of the test sample was at 3.5 GPa while the tensile strength was at 73 MPa, along with a tensile elongation of 6.9%.

TABLE 1

Summary for pMMA co-polymer solubility in (hydrophobic) toluene and water absorption data of plaque sample.

| | Example 1 | Example 2 | Example 3 | Example 4 | Example 5 | Example 6 | Comparative 1 |
|---|---|---|---|---|---|---|---|
| Tg (° C.) | 125 | 128 | 135 | 120 | 119 | 123 | 124 |
| Vicat (° C.) in 10N 50N@50° C./hour | NA | NA | NA | 120/116 | 119/115 | 123/118 | 121/116 |
| Solubility in toluene (23° C.) | Clear, soluble | Clear, soluble | Clear, soluble | Clear, soluble | Clear, soluble | Clear, soluble | Clear, not fully soluble |
| Solubility in toluene (65° C.) | Clear, soluble | Clear, soluble | Clear, soluble | Clear, soluble | Clear, soluble | Clear, soluble | Opaque gel |
| Water absorption (wt. %) at 23° C./504 hours | NA | NA | NA | 1.254 | 1.229 | 1.400 | 1.416 |
| 85° C./85% RH exposure before crazing | NA | NA | NA | 420 hours | 470 hours | 240 hours | 160 hours |
| Polymerization type | Solution | Solution | Solution | Melt | Melt | Melt | Melt |

What is claimed is:

1. A composition comprising a copolymer comprising:
   a) from 0.1 to 10 weight percent monomer units comprising tert-butyl cyclohexyl methacrylate and 3,3,5-trimethylcyclohexyl(meth)acrylate, wherein said tert-butyl cyclohexyl methacrylate and 3,3,5-trimethylcyclohexyl(meth)acrylate monomer units have a trans/cis ratio of from 30/70 to 85/15;
   b) at least 80 weight percent methylmethacrylate monomer units;
   c) from 0 to 10 weight percent other monomer units copolymerizable with methylmethacrylate, wherein said other monomer units comprise from 0.01 to 10 weight percent of methacrylic acid;
   wherein said copolymer has a Tg of from 116° C. to 140° C.

2. The composition of claim 1, wherein said other monomer units further comprise from 0.01 to 25 weight percent of a high Tg comonomer, comprising at least one of acrylic acid, itaconic acid, alpha methyl styrene, maleic anhydride, maleimide, isobornyl methacrylate, norbornyl methacrylate, t-butyl methacrylate, cyclohexyl methacrylate, acrylamide and methacrylamide, and mixtures thereof.

3. The composition of claim 1, further comprising 50 to 3500 ppm of antioxidant, based on the weight of the polymer solids.

4. The composition of claim 1, wherein said copolymer has a weight average molecular weight of from 55,000 g/mole to 200,000 g/mole.

5. The composition of claim 1, wherein said composition has a Total White Light Transmission (TWLT) of at least 91%, as measured on a 3.2 mm thick plaque, using ASTM method D1003.

6. The composition of claim 1, wherein said copolymer has a refractive index of 1.47-1.50 at the wavelength of 589 nm.

7. The composition of claim 1, further comprising from 5 to 95 weight percent of one or more compatible polymers based on the weight of the total polymer solids.

8. An article comprising the composition of claim 1, wherein said article is a lighting pipe, thin wall parts, optical lens, extruded films, (co-)extruded sheet or profile, a thermo-formable sheet, a cast sheet, a composite, an LED/OLED optical component, a co-extruded profiles used in building and constructions or reflective signage.

9. The composition of claim 1, wherein said copolymer has a melt flow rate measured at 230° C. under 3.8 kg from 1.4 g/10 minutes to 4.1 g/10 minutes.

10. The composition of claim 1, wherein said composition has an optical haze of less than 2% as measured on a 3.2 mm thick plaque.

11. The composition of claim 1, wherein said composition has a water absorption at 23° C. for 504 hours of from 1.229% to 1.400% by weight gain.

12. The composition of claim 1, wherein said composition has an 85° C./85% RH high temperature/high humidity resistance without seeing crazing defects at the exposure time of from 240 hours to 470 hours.

* * * * *